US012664495B2

(12) United States Patent
Borhan et al.

(10) Patent No.: US 12,664,495 B2
(45) Date of Patent: Jun. 23, 2026

(54) MANAGEMENT AND OPTIMIZATION OF FREIGHT DELIVERY VEHICLE FLEETS

(71) Applicant: Cummins Inc., Columbus, IN (US)

(72) Inventors: Hoseinali Borhan, Bloomington, IN (US); Ana Guerrero de la Pena, Brownsburg, IN (US); Lisa A. Orth-Farrell, Columbus, IN (US); Jairo Andres Sandoval Leon, Columbus, IN (US)

(73) Assignee: Cummins Inc., Columbus, IN (US)

( * ) Notice: Subject to any disclaimer, the term of this patent is extended or adjusted under 35 U.S.C. 154(b) by 26 days.

(21) Appl. No.: 18/699,332

(22) PCT Filed: Sep. 26, 2022

(86) PCT No.: PCT/US2022/076993
§ 371 (c)(1),
(2) Date: Apr. 8, 2024

(87) PCT Pub. No.: WO2023/059994
PCT Pub. Date: Apr. 13, 2023

(65) Prior Publication Data
US 2024/0394624 A1     Nov. 28, 2024

Related U.S. Application Data

(60) Provisional application No. 63/262,281, filed on Oct. 8, 2021.

(51) Int. Cl.
G06Q 10/00          (2026.01)
G06Q 10/0631        (2023.01)
G06Q 10/083         (2023.01)

(52) U.S. Cl.
CPC . *G06Q 10/06315* (2013.01); *G06Q 10/06312* (2013.01); *G06Q 10/08355* (2013.01)

(58) Field of Classification Search
None
See application file for complete search history.

(56) References Cited

U.S. PATENT DOCUMENTS 6,826,460  B2     11/2004  Kittell et al.
9,079,505  B1      7/2015  Hyde et al.
(Continued)

FOREIGN PATENT DOCUMENTS

CN          113408775        9/2021
EP           1225074         7/2002
(Continued)

OTHER PUBLICATIONS

Rattanamanee, "A Genetic Algorithm for Split Delivery Open Vehicle Routing Problem with Physical Workload Consideration," 2021 Research, Invention, and Innovation Congress: Innovation Electricals and Electronics (RI2C), Bangkok, Thailand, 2021, pp. 1-4 (Year: 2021).*
(Continued)

*Primary Examiner* — Matheus Ribeiro Stivaletti
(74) *Attorney, Agent, or Firm* — Taft, Stettinius & Hollister LLP

(57)          ABSTRACT

A method for optimizing operation of a fleet of vehicles includes providing an optimization network including a plurality of nodes and a plurality of connections therebetween. The nodes define all potential destinations in the network for freight delivery or pickup. The connections define all potential sequences of nodes traversable over the network. The method determines a pre-optimization simulation matrix including a plurality of sets of energy expenditures for traversing respective ones of each of the connections. Each of the plurality of sets of energy expenditures accounts for permutations of a plurality of different vehicle powertrains present in a fleet of vehicles. The method performs an optimization using the pre-optimization simu- (Continued)

lation matrix, fleet information indicating locations and energy states of a plurality of vehicles in the vehicle fleet, mission information indicating a pickup or delivery destination for a plurality of items of freight, and a fleet optimization objective.

18 Claims, 5 Drawing Sheets

(56) References Cited

U.S. PATENT DOCUMENTS

| | | | |
|---|---|---|---|
| 9,550,429 B2 | 1/2017 | Madurai-Kumar et al. | |
| 9,821,790 B2 | 11/2017 | Jones | |
| 9,851,722 B2 | 12/2017 | Kolhouse et al. | |
| 10,437,486 B2 | 10/2019 | Selvam et al. | |
| 11,972,390 B1 * | 4/2024 | Viswanathan | G06Q 10/04 |
| 2014/0232340 A1 | 8/2014 | Jones | |
| 2015/0285651 A1 | 10/2015 | Cerecke | |
| 2018/0188744 A1 | 7/2018 | Switkes et al. | |
| 2018/0211545 A1 | 7/2018 | Smartt et al. | |
| 2019/0035283 A1 | 1/2019 | Dudar | |
| 2020/0156496 A1 | 5/2020 | Light-Holets | |
| 2020/0372805 A1 | 11/2020 | Kim | |
| 2020/0388164 A1 | 12/2020 | Domprobst et al. | |
| 2021/0018324 A1 * | 1/2021 | Sujan | G01C 21/3492 |
| 2021/0110323 A1 * | 4/2021 | Munoz | G06Q 10/06311 |
| 2021/0279831 A1 | 9/2021 | Moore et al. | |
| 2025/0033517 A1 * | 1/2025 | Hancock | B60L 53/66 |

FOREIGN PATENT DOCUMENTS

| | | |
|---|---|---|
| WO | 0062211 | 10/2000 |
| WO | 2014149075 | 9/2014 |
| WO | 2019117894 | 6/2019 |
| WO | 2019143752 | 7/2019 |
| WO | 2019192667 | 10/2019 |

OTHER PUBLICATIONS

International Search Report and Written Opinion, PCTUS2022076993, Cummins Inc., Dec. 5, 2022, 12 pgs.

Kostopoulos et al., "Real-world study for the optimal charging of electric vehicles", Elsevier, Feb. 18, 2020.

Martine et al., "Optimization Approach to Handle Global $CO_2$ Fleet Emission Standards", SAE International, Apr. 5, 2016.

Yinglong et al., "The energy impact of adaptive cruise control in real-world highway multiple-car-following scenarios", SpringerOpen, 2020.

Arasu Mukilan T et al: "Energy Optimal Routing of Vehicle Fleet with Heterogeneous Powertrains Dissertation", PhD thesis, Aug. 18, 2019 (Aug. 18, 2019), pp. 1-198, XP093288052.

Chen Pengfei et al: "Mixed Freight Dynamic Routing Using a Co-Simulation Optimization Approach", IEEE Transactions on Intelligent Transportation Systems, vol. 23, No. 8, Oct. 12, 2021 (Oct. 12, 2021), pp. 12833-12845, XP093288330, Piscataway, NJ, USA, ISSN: 1524-9050, DOI: 10.1109/TITS.2021.3117931, Retrieved from the Internet: URL:https://ieeexplore.ieee.org/document/9568773.

Extended European Search Report, Counter EP Application No. 22879388.1, Dated Jul. 1, 2025, 10 pgs.

First Examination Report, Counter Indian Application No. 202447035144, Dated Jul. 7, 2025, 7 pgs.

Hiermann Gerhard et al: "Routing a mix of conventional, plug-in hybrid, and electric vehicles", European Journal of Operational Research, Elsevier, Amsterdam, NL, vol. 272, No. 1, Jun. 18, 2018 (Jun. 18, 2018), pp. 235-248, XP085460200, ISSN: 0377-2217, DOI: 10.1016/J.EJOR.2018.06.025.

* cited by examiner

Fleet Vehicles

| Vehicle ID | Powertrain Specification | Automation Features | Connectivity Features | Payload (kg, m$^2$) | ESS Mod. | Current location (Long., Lat.) | ... |
|---|---|---|---|---|---|---|---|
| VID1 | Diesel #234 | A1, A2 | C1, C2, C3 | N1, M1 | null | LOa1, LA1 | ... |
| VID2 | Diesel #090 | A1 | C1 | N2, M2 | null | LO2, LA2 | ... |
| VID3 | Diesel #143 | null | n/a | N3, M3 | null | LO3, LA3 | ... |
| VID4 | Mild Hybrid Diesel Electric #432 | A2 | n/a | N4, M4 | null | LO4, LA4 | ... |
| VID5 | Mild Hybrid Diesel Electric #608 | A2, A4 | C1, C3 | N5, M5 | null | LO4, LA4 | ... |
| VID6 | Strong Hybrid Diesel Electric #072 | null | C1, C2, C3 | N6, M6 | Mod. type 1 | LO5, LA5 | ... |
| VID7 | Range Extended Electric #803 | A2, A3, A4 | C3 | N7, M7 | Mod. type 2 | LO5, LA5 | ... |
| VID8 | Fuel Cell #704 | A2, A3, A4 | C2, C3 | N8, M8 | null | LO6, LA6 | ... |
| VID9 | Full Electric #811 | A1, A2, A4 | C1, C2, C3 | N9, M9 | Mod. type 3 | LO7, LA7 | ... |
| ... | ... | ... | ... | ... | ... | ... | ... |

Fig. 2

Energy Resources

| ER ID | Energy Type | Location (long., lat.) | Route(s) | Price | CO$_2$ Load | |
|---|---|---|---|---|---|---|
| 1 | Diesel | LO11, LA11 | R1 | P1 | CL1 | ⋮ |
| 2 | Electric Charging | LO12, LA12 | R1 | P2 | CL2 | ⋮ |
| 3 | Hydrogen | LO13, LA13 | R1, R2 | P3 | CL3 | ⋮ |
| 4 | Battery Exchange | LO14, LA14 | R3 | P4 | CL4 | ⋮ |
| 5 | Electric Charging | LO14, LA14 | R4 | P5 | CL5 | ⋮ |
| 6 | Electric Charging | LO15, LA15 | R5 | P6 | CL6 | ⋮ |
| 7 | Battery Exchange | LO15, LA15 | R5, R6 | P7 | CL7 | ⋮ |
| 8 | Hydrogen | LO15, LA15 | R7 | P8 | CL8 | ⋮ |
| ⋮ | ⋮ | ⋮ | ⋮ | | | ⋮ |

Fig. 3

Delivery Mission Information

| Freight ID | Mass | Dimensions (height, length, width) | Origin (Long., Lat.) | Destination (Long., Lat.) | Delivery time | |
| --- | --- | --- | --- | --- | --- | --- |
| F1 | M1 | H-L-W1 | OLO1, OLA1 | DLO1, DLA1 | H1:M1 | ... |
| F2 | M2 | H-L-W2 | OLO2, OLA2 | DLO2, DLA2 | H2:M2 | ... |
| F3 | M3 | H-L-W3 | OLO3, OLA3 | DLO3, DLA3 | H3:M3 | ... |
| F4 | M4 | H-L-W4 | OLO4, OLA4 | DLO4, DLA4 | H4:M4 | ... |
| ... | ... | ... | ... | ... | ... | ... |

Fig. 5

MANAGEMENT AND OPTIMIZATION OF FREIGHT DELIVERY VEHICLE FLEETS

CROSS-REFERENCE

This application claims priority to and the benefit of International Patent Application No. PCT/US22/76993, filed Sep. 26, 2022, which claims priority to and the benefit of U.S. Application No. 63/262,281 filed Oct. 8, 2022 which is hereby incorporated by reference.

TECHNICAL FIELD

The present disclosure relates generally to management and optimization of fleets of freight delivery vehicles and more particularly, but not exclusively, to freight delivery vehicle fleet optimization including connectivity-based and machine learning-based techniques.

BACKGROUND

A number of efforts have been made to manage and optimize operation of freight delivery vehicles fleets. While offering some benefits, existing approaches suffer from a number of challenges, drawbacks, shortcomings, and unsolved problems. Fleet optimization poses a technically complex, computationally intensive problem and may become prohibitively difficult to implement successfully in practice. For example, the vehicle routing problem (VRP) has been long recognized as technically NP-hard (i.e., exhibiting non-deterministic polynomial-time hardness) with the size of optimization problems that can be solved being limited. In practice, even greater complexity is typically required to optimize a fleet of freight delivery vehicles since additional mission requirements are typically required. Thus, problems of even greater NP-hardness are confronted (e.g., the vehicle routing problem with pickup and delivery (VRPPD), the vehicle routing problem with time windows (VRPTW), the capacitated vehicle routing problem (CVRP), or combinations or variations thereof). There remains a significant unmet need for the unique apparatuses, processes, systems, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY OF THE DISCLOSURE

One embodiment is a unique process of managing or optimizing freight delivery vehicle fleets. A further embodiment is a unique system for managing or optimizing freight delivery vehicle fleets. Further embodiments, forms, objects, features, advantages, aspects, and benefits shall become apparent from the following description and drawings.

BRIEF DESCRIPTION OF THE DRAWINGS

FIG. 2 is a table illustrating example parameters for a plurality of vehicles of a vehicle fleet.

FIG. 3 is a table illustrating example parameters for a plurality of energy resources of a vehicle fleet operating environment.

FIG. 5 is a table illustrating example parameters of delivery mission information.

DETAILED DESCRIPTION OF EXAMPLE EMBODIMENTS

Figure 1:
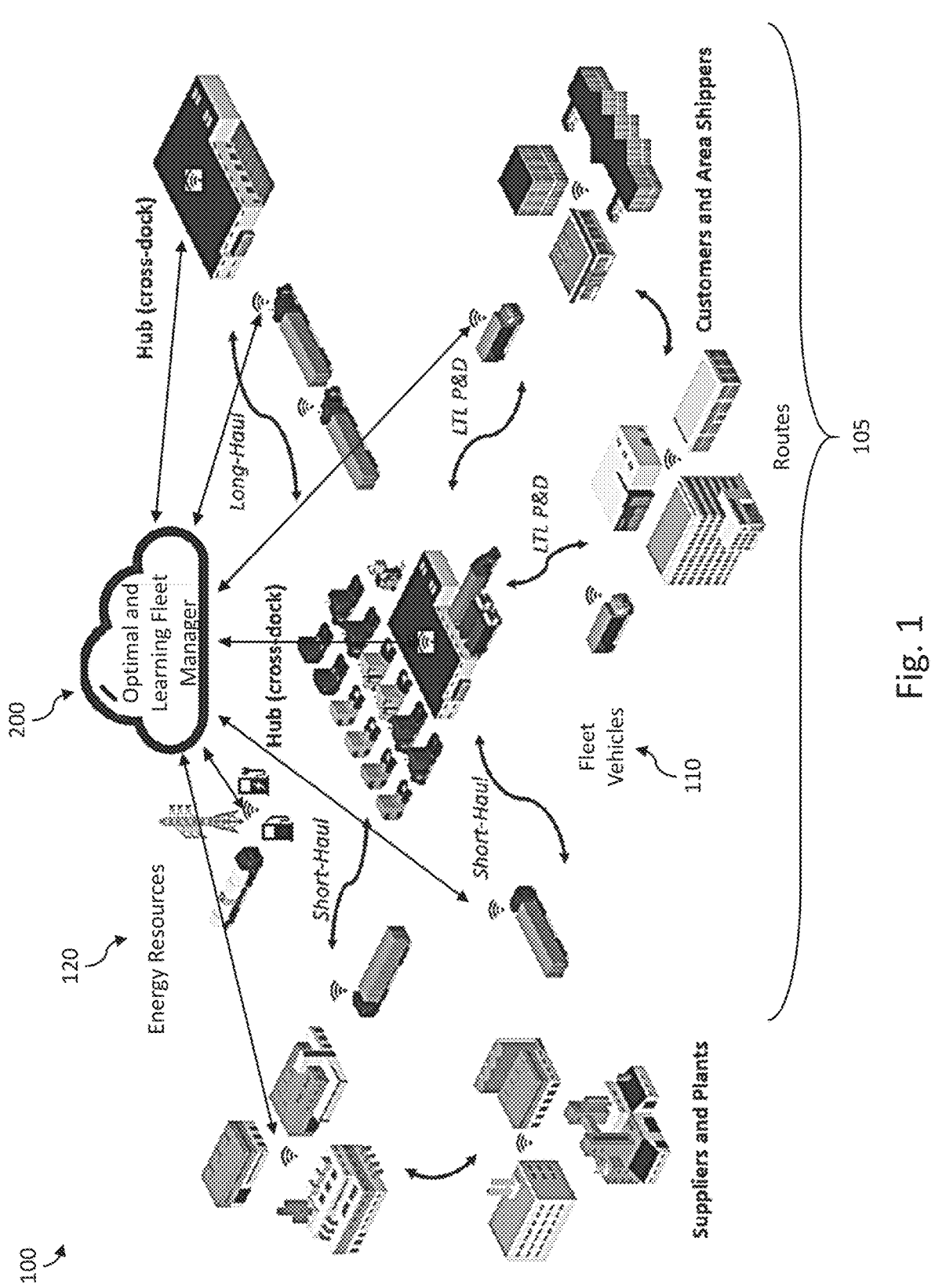
FIG. 1 is a schematic illustration of an example operation of a delivery vehicle fleet.

With reference to FIG. 1, there is illustrated an example environment 100 including a delivery vehicle fleet 110 comprising a plurality of vehicles, a plurality of mission routes 105, and a plurality of energy resources 120. The mission routes may include long haul mission routes (for example, multi-day routes between freight distribution hubs), short-haul mission routes (for example, single-day routes between freight distribution hubs or between a freight distribution hub and a delivery or pickup location), and less than load pickup and delivery (LTL P&D) mission routes, to name several examples. Each of the mission routes may comprise a start location, an end location, and a travel path between the start location and the end location, The plurality of mission routes may be generated in response to one more delivery requirements as further described herein.

As illustrated in FIG. 2, the example vehicle fleet 110 comprises a plurality of vehicles each of which is identified by a vehicle ID. Each of the plurality of vehicles has a defined powertrain specification indicating a category or type of powertrain, for example, a combustion engine powertrain (e.g., a diesel engine, natural gas engine, or gasoline engine powertrain), a combustion-electric powertrain (e.g., a mild hybrid, strong hybrid, range-extended electric, or plug-in hybrid), a battery-electric or all-electric powertrain, or a fuel cell electric powertrain The defined powertrain specification may further include a particular model and configuration of the powertrain (indicated with unique identifying numbers in the illustrated example).

Each of the plurality of vehicles may also have a defined set of zero or more automation features (denoted A1, A2, A3, A4 in the illustrated example) which may be, for example, adaptive cruise control (ACC), cooperative adaptive cruise control (CACC), predictive cruise control (PCC), advanced driver assistance systems (ADAS), engine-off coasting, neutral coasting, torque management, vehicle platooning systems, as well as various other automation features.

Each of the plurality of vehicles may further have a defined set of zero or more connectivity features (denoted C1, C2, C3 in the illustrated example) which may be, for example, vehicle-to-vehicle (V2V), vehicle-to-infrastructure (V2I), or vehicle-to-everything (V2X) communication features. Such connectivity features may be utilized in connection with various automation features, for example, to adjust vehicle operation in anticipation of future route conditions such as traffic congestion, traffic signal, and weather conditions.

Each of the plurality of vehicles may also have a defined payload capacity which may comprise a mass capacity and a volume capacity (denoted N1, M1 through N9, M9 in the illustrated example). In some forms, the payload capacity may be defined in terms of weight instead of or in addition to mass. In some forms the payload capacity may be a maximum payload capacity, a nominal payload capacity, or a may be otherwise defined according to various criteria as will occur to one of skill in the art.

Each of the plurality of vehicles may further have a defined energy storage system modification or modularity capability (ESS Mod.) which may be, for example, a configuration and capability to receive and operate with batteries of different capacities or sizes or to receive and operate with different numbers of batteries. Each of the plurality of vehicles may also have a defined current vehicle location which may be specified, for example, in terms of longitude and latitude (Long. Lat.).

It shall be appreciated that the foregoing examples are not limiting and that additional or alternative parameters may be defined for the plurality of vehicles in various embodiments. It shall be further appreciated that the vehicle fleet may include a greater or lesser number of vehicles.

As illustrated in FIG. 3, the energy resources 120 comprise a plurality of energy resources each of which is identified by an energy resource ID (ER ID). Each of the plurality of energy resources has a defined energy type (for example, diesel, electric charging, hydrogen, and battery exchange, to name several examples). Each of the plurality of energy resources further as a defined location which may be specified, for example, in terms of longitude and latitude (Long. Lat.) and which may be common to two or more energy resources in the case of co-located or multi-fuel energy resource facilities.

Each of the plurality of energy resources may further have one or more associated routes (denoted R1 through R7 in the illustrated example). The criteria for inclusion of an associated route may be, for example, a distance and/or travel time between a given route (once determined) and a given energy resource. Each of the plurality of energy resources may also have a defined price (denoted P1 through P8 in the illustrated example) and a defined $CO_2$ load (denoted CL1 through CL8 in the illustrated example). The defined $CO_2$ load may comprise one or more metrics indicating the $CO_2$ emissions burden per unit of energy and may be inclusive of $CO_2$ emissions generated in producing, the energy resources (e.g., well to tank $CO_2$ emissions) as well as the $CO_2$ emissions resulting from the utilization of the energy resource (e.g., tank to wheel $CO_2$ emissions).

It shall be appreciated that the foregoing examples are not limiting and that additional or alternative parameters may be defined for the plurality of vehicles in various embodiments. It shall be further appreciated that a greater or lesser number of energy resources may be present in various embodiments.

Figure 4:
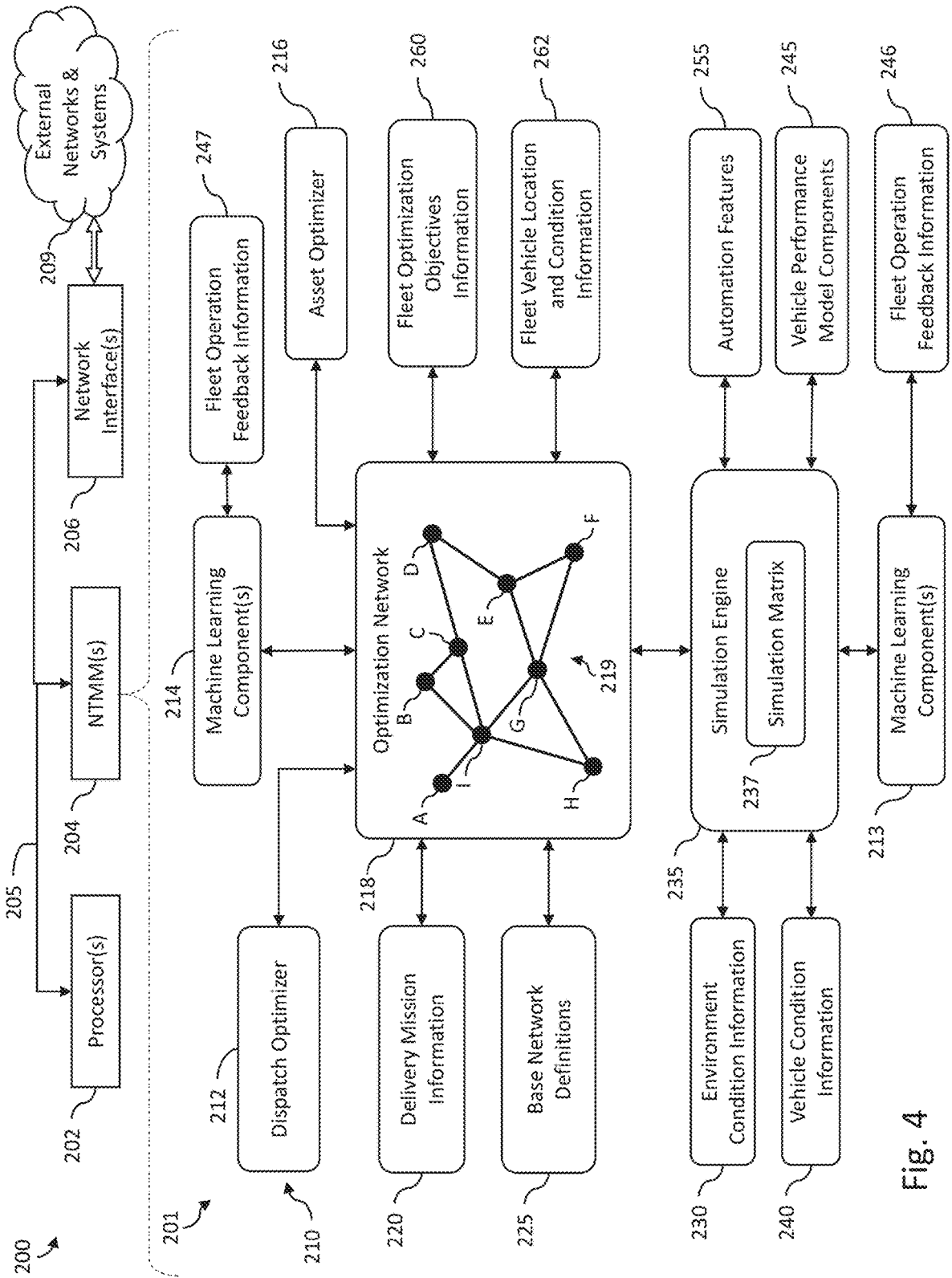
FIG. 4 is a schematic diagram illustrating an example system and example process according to the present disclosure.

With reference to FIG. 4, three is illustrated an example simulation and optimization system 200 which may be configured and operable to perform simulation and optimization processes according to the present disclosure. System 200 includes one or more processors 202 which are in operative communication with and configured to execute simulation and optimization instructions 201 stored in one or more non-transitory memory media 204. One or more communication links 205 may provide operative communication between one or more processors 202 and the one or more non-transitory memory media 204. System 202 may also include one or more network interfaces 206 which may be in operative communication with the one or more processors 202 and the one or more non-transitory memory media 204 via the one or more communications links 205 and may also be in operative communication with one or more external networks or systems 209.

System 200 may be provided in a number of configurations, forms, and implementations including, for example, as one or more cloud computing systems, data centers, desktops, industrial computers, laptops, servers, tablets, workstations, combinations thereof, or other configurations, forms, and implementations as will occur to one of skill in the art with the benefit and insight of the present disclosure. Thus, it shall be appreciated that the components and operations of system 200 may be distributed across or among multiple computing devices in operative communication with one another over various communication links. Additionally, the constituent components of system 200 may themselves be provided in a number of configurations, forms, and implementations, including the following examples.

The one or more processors 202 may be implemented or provided in a number of configurations, forms, and implementations including, for example, as one or more microprocessors, microcontrollers, application specific integrated circuits (ASICs), field programmable gate arrays (FPGAs), other integrated circuits, or combinations thereof. In some forms, the one or more processors 202 may additionally or alternatively comprise or may be provided in combination with other digital circuitry, analog circuitry, or hybrid analog-digital circuitry or combinations thereof, for example, arithmetic logic units (ALUs), amplifiers, analog calculating machine(s), analog to digital (A/D) and digital to analog (D/A) converters, clocks, communication ports, filters, format converters, modulators or demodulators, multiplexers, and de-multiplexers, non-transitory memory devices and media, oscillators, cores, signal conditioners, state machine(s), and timers, as well as other circuitry as will occur to one of skill in the art with the benefit and insight of the present disclosure.

The one or more non-transitory memory media 204 may be provided in a number of configurations, forms, and implementations including, for example, as one or more solid-state memory devices, drives, or other storage devices. In some forms, the one or more non-transitory memory media 204 may comprise semiconductor memory components (e.g., various types of nonvolatile memory components and/or volatile memory components), magnetic memory components, optical memory components, magneto-optical memory components, or combination thereof. The one or more non-transitory memory media 204 may be implemented or provided in common devices or packaging with the one or more processors 202, such as in one or more memory devices provided in a desktop, industrial computer, laptop, server, tablet, or workstation. The one or more non-transitory memory media 204 may additionally or alternatively be implemented or provided in separate devices or packaging, such as in stand-alone memory or storage devices. Furthermore, such separate devices or packaging may be physically connected or coupled with, operatively connected or coupled with, co-located with, or remotely located from other components of system 200.

The one or more communication links 205 may be provided in a number of configurations, forms, and implementations including, for example, as one or more communication busses, controller area networks (CAN), local area networks (LAN), on-chip or intra-chip communication features, other datalinks, combinations thereof, or other configurations, forms, and implementations as will occur to one of skill in the art with the benefit and insight of the present disclosure. The one or more network interfaces 206 may be provided in a number of configurations, forms, and implementations such as one or more network interface cards, routers, switches, ports, sockets, edge devices, combinations thereof, or other configurations, forms, and implementations as will occur to one of skill in the art with the benefit and insight of the present disclosure. The one or more external networks or systems 209 may be provided in a number of configurations, forms, and implementations including, for example, private or privately addressable networks or systems, or public or publicly addressable networks or systems.

Simulation and optimization instructions 201 include a number of constituent components which may be configured and implemented as parts or portions of an overall program, as separate programs or program modules interacting with one another, or in other architectures as will occur to one of skill in the art with the benefit and insight of the present disclosure. It shall be further appreciated that the simulation and optimization instructions 201 may be implemented in and executed by one or more computing devices of system 200 or by one or more instances of system 200 as well as one or more instances of other computing systems as will occur to one of skill in the art with the benefit and insight of the present disclosure.

Simulation and optimization instructions 201 includes optimization components 210 including dispatch optimizer 212, machine learning component(s) 214, and asset optimizer 216 which operate in connection with optimization network 218. Optimization components 210 also operates in connection with components 220, 225, 230, 235, 240, 245, 255, and 260. In some respects, components 220, 225, 230, 235, 240, 245, 255, and 260 may also be considered to be optimization components, for example, to the extent that they generate information provided to or utilized by the optimization network 218 or otherwise contribute to the determination, generation, maintenance, modification, or updating of the optimization network 218. In some respects, components 220, 225, 230, 235, 240, 245, 255, and 260 may be considered to be distinct from optimization components 210 or other optimization components, for example, to the extent that they may operate independently from and without requiring operation of optimization components 210 or other optimization components.

Dispatch optimizer 212 performs an optimization of vehicle route assignments in connection with the optimization network 218 and may also perform an optimization of vehicle settings in connection therewith. The optimization of vehicle route assignments determines an optimized assignment of particular vehicles of a vehicle fleet to particular dispatch mission routes established for the delivery and/or pickup of a plurality of items of freight. The optimizations performed by dispatch optimizer 212 operate upon and utilize information of a simulation matrix 237 which is calculated or determined by simulation engine 235 and provided to optimization network 218.

Simulation engine 235 may calculate or determine the simulation matrix 237 prior to performance of an optimization and may therefore be considered to be of a precalculated or predetermined form. Use of a predetermined simulation matrix 237 reduces the computational burden on the dispatch optimizer 210 when performing an optimization in connection with optimization network 218. The optimization of vehicle settings determines one or more optimized operational settings for the vehicles assigned to particular dispatch mission routes (e.g., vehicle speed for portions of a dispatch mission route, vehicle stopping to obtain replenishment of energy, use of automation features, operator prompts such as expected speed). Dispatch optimizer 212 may operate over a number of time horizons, for example, by performing daily optimization, multiple optimizations per day (for example, optimizations for day segments 1 through n), and optimizations for periods including multiple days or portions thereof. It shall be appreciated that simulation matrix 237 is one example of a pre-optimization simulation matrix calculated prior to performing an optimization, also referred to as a pre-calculated simulation matrix, including a plurality of sets of energy expenditures for traversing respective ones of each of the connections, where each of the plurality of sets of energy expenditures accounts for permutations of a plurality of different vehicle powertrains present in a fleet of vehicles.

Machine learning component(s) 214 performs machine learning operations for optimizing one or more of dispatch optimizer 212, optimization network 218, and simulation engine 235. The machine learning operations may comprise a number of types of machine learning or artificial intelligence operations. The machine learning operations may including imposing one or more adjustments or perturbations on the dispatch optimizer 212, optimization network 218, and simulation engine 235 (or the models utilized thereby) which may be configured to evaluate, test, and validate the efficacy and validity of such optimizations or modeling. Machine learning component(s) 214 may operate over a number of time horizons corresponding to multiple instances of the time horizons of dispatch optimizer 212. In some embodiments, machine learning component(s) 214 may be combined with or integral to dispatch optimizer 212. In some embodiments, machine learning component(s) 214 receives fleet operation feedback information 247 indicating the actual operational performance of one or more vehicles of a fleet and may perform machine learning operations to modify or optimize the simulation performed in connection with optimization network 218. The fleet operation feedback information 247 may be provided via one or more on-vehicle telematics systems, data loggers, or via other systems and techniques as will occur to one of skill in the art with the benefit of the present disclosure. It shall be appreciated that the machine learning component(s) 214 are an example of machine learning components configured to modify performance of an optimization performed in connection with an optimization network such as optimization network 218 in response to fleet operation feedback.

Machine learning component(s) 213 receive fleet operation feedback information 246 indicating the actual operational performance of one or more vehicles of a fleet and, in response to the fleet operations feedback information, performs machine learning operations to modify one or more aspects of a model simulation engine 235. The machine learning operations may comprise a number of types of machine learning or artificial intelligence operations. The fleet operation feedback information 246 may be provided via one or more on-vehicle telematics systems, data loggers, or via other systems and techniques as will occur to one of skill in the art with the benefit of the present disclosure. Machine learning component(s) 213 may be associated with or may share features and functions in common with machine learning component(s) 214 or may be separate components configured with different features and functions. The fleet operation feedback information 246 may comprise an additional instance or transmission of fleet operation feedback information 247 or may comprise separate or different information. It shall be appreciated that the machine learning component(s) 213 are an example of machine learning components configured to update a model component utilized in determining the pre-optimization simulation matrix in response to fleet operation feedback.

Machine learning component(s) 213 and machine learning component(s) 214 may be configured and provided in a number of forms using a number of machine learning or other artificial intelligence techniques. Such techniques include, for example, supervised learning techniques, unsupervised learning techniques, reinforcement learning techniques, deep learning techniques, neural networks, and other machine learning or artificial intelligence techniques suitable for modifying or optimizing a simulation model based upon empirical feedback or modifying or optimizing an optimization performed in connection with an optimization network.

Asset optimizer 216 initiates and performs a number of aspects of an optimization of asset acquisition or upgrade which evaluates and determines potential vehicle or powertrain acquisitions or upgrades indicated to provide an increase in fleet operating efficiency and/or a lowering of total cost of ownership. Asset optimizer 216 may operate over a time horizon longer than dispatch optimizer 212, for example, on a monthly, quarterly, semi-annual, or annual time horizon. Asset optimizer 216 may, for example, provide recommendations on acquisition of additional types of vehicles for a fleet, maintenance of existing fleet vehicles, or improvements or upgrades of existing vehicles in a fleet.

Optimization network 218 includes a plurality of nodes (labeled alphabetically A through I in the illustrated example) and a plurality of connections between respective pairs of the plurality of nodes. The connections may be referred to directionally according to their respective nodes. Thus, for example, the connection from node B to node C may be referred to as connection B-C, and the connection from node C to node B may be referred to as connection C-B. The plurality of nodes define all potential destinations in the optimization network 218 for freight delivery or pickup. The plurality of connections define all potential sequences of destinations traversable over the optimization network 218. The optimized dispatch mission routes determined by dispatch optimizer comprise a sequence of a plurality of nodes and connections of optimization network, a particular vehicle associated therewith, items of freight for delivery or pickup, and delivery or pickup timings, and may also include operation settings for the vehicle for portions of the dispatch mission route. It shall be appreciated that optimization network 218 is one example of a computer system-based optimization network including a plurality of nodes and a plurality of connections between respective pairs of the plurality of nodes, where the plurality of nodes define all potential destinations in the optimization network for freight delivery or pickup, and the plurality of connections define all potential sequences of nodes traversable over the optimization network.

The plurality of nodes and connections of optimization network 218 may be established by base network definitions 225. For example, base network definitions 225 may be predetermined for a given vehicle fleet based on the current geographic scope of service offered by the vehicle fleet. Over time, base network definitions 225 may be updated for the vehicle fleet based on changes to the geographic scope of service offered by the vehicle fleet. Base network definitions 225 may include distance and road grade information for each of the connections between nodes. Alternatively, such information may be separately provided by other inputs to optimization network 218.

It shall be appreciated that the nodes of optimization network 218 may be defined and provided at a variety of scales, for example, at an intrastate or interstate scale wherein the nodes indicate municipalities, a metropolitan area scale wherein the nodes indicate neighborhoods or other subdivisions of a metropolitan area, or at various other scales as will occur to one of skill in the art with the benefit and insight of the present disclosure. It shall also be appreciated, that the connections between nodes of optimization network 218 may comprise abstracted or nominalized routes, rather than specific road-by-road or turn-by-turn instructions, and that the information associated with the connections may be of an averaged, generalized, representative, or approximated form. Furthermore, such forms may be updated over time via operation of machine learning component(s) 214 in assessing and improving the accuracy and operation of optimization network 218, simulation 235, or other components of system 200.

The nodes and connections of optimization network 218 are provided and associated with information of simulation matrix 237 which, as noted above, may be precalculated or predetermined by simulation engine 235 and provided to or accessed by optimization network 218 prior to performing an optimization using optimization network 218. The simulation matrix 237 includes a set of energy expenditures for traversing each of the connections between nodes of optimization network 218. Each set of energy expenditures may be directionally specific. Thus, for example, one set of energy expenditures may be provided for traversing connection B-C (from node B to node C), and another set of energy expenditures may be provided for traversing connection C-B (from node C to node B). Each set of energy expenditures may account for and encompass permutations over a plurality of dimensions arising from variation of a plurality of factors.

Simulation engine 235 may perform simulations for each of a plurality of vehicle configurations present in a vehicle fleet operating over each connection in optimization network 218. Such simulations may utilize a plurality of vehicle models in combination with distance and road grade information of optimization network 218 and other simulation information described herein to simulate operation of a corresponding plurality of vehicle configurations present in a vehicle fleet over each connection of optimization network 218 and to determine energy expenditure values for each simulation. The vehicle models may be provided by or determined from vehicle performance model components 245 and may comprise a plurality digital twin model each established for and corresponding to a respective vehicle or vehicle type of a given vehicle fleet. The digital twin models may account for variation in powertrain types that may be present in a mixed-powertrain vehicle fleet including, for example, various types of diesel engine vehicles, natural gas vehicles, strong hybrid combustion-electric vehicles, mild hybrid combustion-electric vehicles, range-extended electric vehicles, plug-in hybrid electric vehicles, battery electric vehicles, fuel-cell electric vehicles, and other types of vehicle powertrains. The digital twin models may account for non-powertrain differences between vehicle configurations, such as loss coefficients (e.g., aerodynamic, rolling, or other losses) and unloaded vehicle mass which may be present in a vehicle fleet. Such differences may be accounted for by different vehicle classes including, for example, class 5 vehicles, class 6 vehicles, class 7 vehicles, class 8 non-sleeper vehicles, class 8 sleeper vehicles, or other classes or categories. The digital twin models may be updated and improved over time by operation of machine learning component(s) 214 or by external substitution or modification as new or improved models become available.

Each set of energy expenditures may additionally account for permutations of a plurality of initial vehicle energy states over a range of potential initial vehicle energy states. Initial vehicle energy state information may be provided by or determined from vehicle information 240. The plurality of initial vehicle energy states may be separately defined for different vehicle configurations or vehicle models. Thus, for example, a plurality of initial vehicle energy states for a diesel vehicle may include multiple states of remaining fuel which are points along a range of possibilities (e.g., 500 L, 400 L, 300 L, 200 L, 100 L, 0 L for a vehicle with a 500 L capacity). For a battery electric vehicle, the plurality of initial vehicle energy states may include multiple battery states of charge which are points along a range of possibilities (e.g., 100%, 80%, 60%, 40%, 20%, 0%). It shall be appreciated that a simulation may subsequently interpolate between values corresponding to these points to obtain optimizations of intermediate states. It shall be further appreciated that various absolute or relative units may be utilized for each of the initial energy states of various vehicle configurations.

Each set of energy expenditures may additionally account for permutations of a plurality of initial vehicle freight load states over a range of potential initial vehicle freight load states. Initial vehicle freight load state information may be provided by or determined from vehicle information 240. The plurality of initial vehicle freight load states may be separately defined for different vehicle configurations or vehicle models depending on the maximum freight capacity of a given vehicle. Thus, for example, a plurality of initial vehicle freight load states for a vehicle with a 40,000-pound freight capacity may include multiple states freight loading (e.g., 40,000 lb., 30,000 lb., 20,000 lb., 0 lb)). It shall be appreciated that a simulation may subsequently interpolate between values corresponding to these points to obtain optimizations of intermediate states. It shall be further appreciated that various absolute or relative units may be utilized for each of the initial energy states of various vehicle configurations.

Each set of energy expenditures may additionally account for permutations of environmental conditions, such as traffic conditions, (e.g., by type such as light, medium, heavy, or by time, such as morning, afternoon, evening, night), road conditions (e.g., dry, wet, ice, snow, etc.), and locations of available energy resources (e.g. diesel fueling, battery charging, battery exchange, hydrogen filling). The environmental conditions for different connections of optimization network 218. Environmental conditions may be provided by or determined from environmental conditions information 230. It shall be appreciated that a simulation may subsequently interpolate between values corresponding to particular values of environmental condition information to obtain optimizations of intermediate states. It shall be further appreciated that various absolute or relative units may be utilized for each type of environmental condition information.

Each set of energy expenditures may additionally account for permutations in the use of automation features (e.g., features automating operation of a vehicle or using environment connectivity features in controlling vehicle operation) that may be utilized during operation of a vehicle. Such features may include platooning, adaptive cruise control (ACC), predictive cruise control (PCC), idle coasting, engine-off coasting and other automation features which may be present in one or more vehicles of a vehicle fleet. The automation features may be separately defined for different vehicle configurations or vehicle models. The automation features information may be provided by or determined from automation features component 255. The automation features may be utilized to vary baseline assumptions about how a vehicle will be operated over a connection of optimization network 218 and may comprise configurations, parameters, settings, or augmentations to a plurality digital twin model established for and corresponding to the vehicle information for the plurality vehicles of the vehicle fleet.

From the foregoing examples, it can be seen that simulation matrix 237 may include a plurality of sets of energy expenditures for traversing each of the connections between nodes of optimization network 218 for each vehicle in a fleet, under each of initial energy conditions, under each of multiple initial load conditions, and under each of multiple environmental conditions. Once calculated or determined, simulation matrix 237 is provided to or accessed by optimization network 218 and associated with the nodes and connections thereof for use in connection with optimization operations performed in connection with dispatch optimizer 212, machine learning component(s) 214, and asset optimizer 216. Such optimizations may also utilize delivery mission information 220, fleet optimization objectives information 260, and fleet vehicle location and condition information 262.

Fleet optimization objectives information 260 may include one or more fleet efficiency objectives such as minimizing energy expenditure, minimizing well-to-wheel $CO_2$ emissions, or other objectives. The fleet optimization objectives may additionally or alternatively include payload mass or weight optimization, and delivery/mission time optimization. Fleet optimization objectives information 260 are provided to or accessed by optimization network 218 and may be provided to dispatch optimizer 212 either directly or via optimization network 218.

Vehicle location and condition information 262 includes the current location of a plurality of vehicles of a vehicle fleet and one or more states or conditions of the vehicles (e.g., current energy state, maintenance state, age or mileage, or other information about the current state or condition of each vehicle). Vehicle location and condition information 262 may be obtained from each of the plurality of vehicles in the fleet via vehicle connectivity infrastructure or via periodic reporting, polling, or other monitoring or communication techniques.

Dispatch optimizer 212 may utilize the sets of energy expenditures from simulation matrix 237 associated with optimization network 218 in combination with delivery mission information 220 and fleet optimization objectives 260 to determine a dispatch assignment of a plurality of vehicles of a plurality of vehicle fleet to respective ones of a plurality of dispatch mission routes. Each of the plurality of dispatch mission routes may include at least a sequence of nodes and connections therebetween, associated items of freight to be delivered or picked up at each node, and associate delivery or pickup timings (e.g., times or time ranges). Each of the plurality of dispatch mission routes may further include, settings for automation features to be utilized over indicated portions of the dispatch mission route. Dispatch optimizer 212 may utilize a number of optimization techniques to determine optimized values of the foregoing parameters. In some forms, dispatch optimizer 212 may utilize mixed integer programming optimization techniques. In some forms, dispatch optimizer 212 may utilize machine learning optimization techniques.

It shall be appreciated that the optimizations performed by dispatch optimizer 212 are examples of optimizations using a pre-optimization simulation matrix, fleet information indicating current locations and current energy states of a plurality of vehicles in the vehicle fleet, mission information indicating a pickup destination and a delivery destination for a plurality of items of freight, and a fleet optimization objective. It shall be further appreciated that the optimizations performed by dispatch optimizer 212 are examples of optimizations that determine a plurality of optimized dispatch assignments each defining at least a particular vehicle of the fleet, a selection of items from the plurality of items of freight, and a sequence of nodes for delivery or pickup the selection of items.

As illustrated in FIG. 5, the delivery mission information may comprise information of a plurality of items of freight each of which is identified by a freight ID. Each of the plurality of items of freight may have a defined mass (or alternatively or additionally a defined weight), defined dimensions, a defined origin location, a defined destination location, and a defined delivery time parameter (for example, a delivery time or time range). Delivery mission information may be obtained in a number of manners including, for example, by accessing stored information, calculating or computing information, receiving information as one or more inputs, reading information from memory, remote calling of other processes, otherwise processing information, or combinations the foregoing and/or other techniques as will occur to one of skill in the art. In some forms, the delivery mission information may be communicated or provided by one or more fleet operators and/or prompted or pulled from one or more fleet operators, for example, from one or more external networks or systems such as external networks and systems 209.

It shall be appreciated that system 200 and be utilized to perform a number of fleet operation processes. A number of example embodiments provide vehicle dispatching decisions with optimized routing and powertrain-route matching. In some embodiments, optimized routing and powertrain-route matching may be provided for fleets of vehicles with mixed powertrain types using connectivity enabled data of routes, powertrain specifications, and fleet requirements to dispatch the truck to the right routes. In some embodiments, route condition information relating to charging/fueling stations may be obtained using network connectivity features and may be utilized in optimizing dispatching decisions of electric vehicles such as hybrid, range-extended electric vehicles, or electric vehicles. In some embodiments, route condition information relating to location and availability of on-road wireless charging capabilities in routing and truck dispatching decisions may be utilized in optimizing dispatching decisions of electric vehicles such as hybrid, range-extended electric vehicles, or electric vehicles.

In some embodiments, optimization of fleet operation may include optimization of vehicle-route assignments based on the availability of vehicle automation features such as advanced driver-assistance systems (ADAS), adaptive cruise control, predictive cruise control, predictive adaptive cruise control, and platooning features. In some embodiments, optimization of fleet operation may include optimization vehicle automation features during vehicle operation. In some forms, such optimization may include adjusting cruise speed target based on hub/distribution centers/depot status, for example, if there is a delay to have the hub ready for delivery, the cruise speed can be reduced automatically to save fuel and avoid idling at hubs/distribution centers.

Some embodiments may utilize powertrain communication with fleet management to provide powertrain electrical status for routing/truck dispatching decisions e.g. battery life status. In some embodiments, optimization of fleet operation may be performed in combination with learning algorithms to evaluate changes in vehicle/powertrain characteristics such as battery life and to account for the same in fleet management optimization operations.

In some embodiments, optimization of fleet operation may include optimization of fleet-level emission complacence through fleet management by dispatching the right trucks for the right route with the right powertrain options and automation features. In some embodiments, optimization of fleet operation may utilize a digital twin model of the fleet to run different scenarios for predictive optimal fleet management decisions.

In some embodiments, optimization of fleet operation may include platooning-specific optimization. In some embodiments, optimization of fleet operation may consider platooning opportunity during fleet management decisions e.g. truck dispatching. In some embodiments, optimization of fleet operation may include opportunistic platooning during vehicle operation using connectivity to transportation traffic centers to increase likelihood of having neighboring vehicles providing platooning opportunities. Some embodiments may include communicating information such as weight, route, and tire status for platooning engagement decisions.

Some embodiments may utilize and provide the fleet management and optimization techniques in a transportation-as-a-service platform in which optimizations decisions are made for multiple fleets. Some such embodiments may provide collaboration with other fleets using fleet-to-fleet connectivity.

In some embodiments, optimization of fleet operation may include optimizations of battery usage, charging, and exchange or interchange. For example, the optimization may include optimization of charging locations, charging times, and charging rates accounting for future operation of vehicles of a fleet. As a further r example, with modular battery designs allowing addition, removal, or exchange of batteries in hub/depots, an intelligent fleet manager may optimize the battery capacity during overall fleet decisions in routing and truck dispatching. This may include the cost of increasing battery size (reduced capacity, increased weight, and battery life loss) versus fuel economy/emission benefits on increasing battery capacity. For example in range-extended or electric powertrains, optimizing the battery size for a given trip is very helpful to increase payload, electric range, and battery life. Some optimization of fleet operation may determine battery swap events, for example, changing out a discharged battery for a charged battery, changing out a batter of a first capacity with a battery of a second capacity greater than or less than the first capacity, and/or changing out a battery with a first battery aging status with a battery of a second battery aging status greater than or less than the first battery aging status. Such optimizations may account for ambient temperature conditions and the influence of ambient temperature on battery performance and the resulting impact on the fleet optimization. Such optimizations may include range optimization, payload mass or weight optimization, and delivery/mission time optimization.

In some embodiments, optimization of fleet operation may determine platooning orders or arrangements in response to electrified powertrain per SOC, for example, putting vehicles with lower battery states of charge in a trailing or following position to reduce load and increase electric range. This may allow vehicles with a low state of charge to be dispatched to trips where platooning is available where when operation without such platooning would not be possible.

In some embodiments, optimization of fleet operation may account for geofencing limitation, for example, by limiting the assignment of vehicles according to avoid areas where the vehicles do not meet local emissions requirements, such as by avoiding routing of diesel engine vehicles through zero emissions region.

As illustrated by this detailed description, the present disclosure contemplates a plurality of embodiments. A first example embodiment is a method for optimizing operation of a fleet of vehicles, the method comprising: providing a computer system-based optimization network including a plurality of nodes and a plurality of connections between respective pairs of the plurality of nodes, the plurality of nodes defining all potential destinations in the optimization network for freight delivery or pickup, the plurality of connections defining all potential sequences of nodes traversable over the optimization network; determining a pre-optimization simulation matrix including a plurality of sets of energy expenditures for traversing respective ones of each of the connections, each of the plurality of sets of energy expenditures accounting for permutations of a plurality of different vehicle powertrains present in a fleet of vehicles; and performing an optimization using the pre-optimization simulation matrix, fleet information indicating current locations and current energy states of a plurality of vehicles in the vehicle fleet, mission information indicating a pickup destination and a delivery destination for a plurality of items of freight, and a fleet optimization objective; wherein the optimization determines a plurality of optimized dispatch assignments each defining at least a particular vehicle of the fleet, a selection of items from the plurality of items of freight, and a sequence of nodes for delivery or pickup the selection of items.

A second example embodiment includes the features of the first example embodiment, wherein the plurality of different vehicle powertrains comprise two or more of a combustion engine powertrain, a combustion-electric powertrain, a purely battery-electric powertrain, and a fuel-cell electric powertrain.

A third example embodiment includes the features of the first example embodiment, wherein each set of energy expenditures further accounts for one or more of: a first plurality of points over a range of potential initial vehicle energy states; a second plurality of points over a range of potential initial vehicle freight load states; and a third plurality of points over a range of potential environmental conditions.

A fourth example embodiment includes the features of the third example embodiment, wherein the optimization performs an interpolation between two points of at least one of the first plurality of points, the second plurality of points, and the third plurality of points, the interpolation being in response to an input indicating a value intermediate said two points.

A fifth example embodiment includes the features of the first example embodiment, wherein each set of energy expenditures further accounts for utilization of one or more automation features in controlling one or more vehicles of the fleet.

A sixth example embodiment includes the features of the first example embodiment, wherein the optimization accounts for availability of one or more energy resources in determining the plurality of optimized dispatch assignments.

A seventh example embodiment includes the features of the sixth example embodiment, wherein the one or more energy resources include one or more of a diesel fueling, natural gas fueling, battery charging, battery exchange, and hydrogen filling.

An eighth example embodiment includes the features of the first example embodiment, wherein the fleet optimization objective comprises a minimization of net energy expenditure of the fleet of vehicles.

A ninth example embodiment includes the features of the first example embodiment and comprises: operating a machine learning component to update a model component utilized in the determining the pre-optimization simulation matrix in response to fleet operation feedback provided by a telematics system; and repeating the determining the performing the optimization in response to the updated model component.

A tenth example embodiment includes the features of any one of the first through ninth example embodiments, and comprises dispatching a plurality of vehicles of the fleet of vehicles according to the plurality of optimized dispatch assignments. A further form of the tenth example embodiment comprises dispatching a plurality of vehicles of the fleet of vehicles according to the plurality of optimized dispatch assignments and controlling operation of the plurality of vehicles according to the dispatching.

An eleventh example embodiment is a system for optimizing operation of a fleet of vehicles, the system comprising: a computer system including one or more processors in operative communication with one or more non-transitory memory media, the one or more non-transitory memory media configured with instructions executable by one or more of the one or more processors to: provide an optimization network including a plurality of nodes and a plurality of connections between respective pairs of the plurality of nodes, the plurality of nodes defining all potential destinations in the optimization network for freight delivery or pickup, the plurality of connections defining all potential sequences of nodes traversable over the optimization network; determine a pre-optimization simulation matrix including a plurality of sets of energy expenditures for traversing respective ones of each of the connections, each of the plurality of sets of energy expenditures accounting for permutations of a plurality of different vehicle powertrains present in a fleet of vehicles; and perform an optimization using the pre-optimization simulation matrix, fleet information indicating current locations and current energy states of a plurality of vehicles in the vehicle fleet, mission information indicating a pickup destination and a delivery destination for a plurality of items of freight, and a fleet optimization objective; wherein the optimization determines a plurality of optimized dispatch assignments each defining at least a particular vehicle of the fleet, a selection of items from the plurality of items of freight, and a sequence of nodes for delivery or pickup the selection of items.

A twelfth example embodiment includes the features of the eleventh example embodiment, wherein the plurality of different vehicle powertrains comprise two or more of a combustion engine powertrain, a combustion-electric powertrain, a purely battery-electric powertrain, and a fuel-cell electric powertrain.

A thirteenth example embodiment includes the features of the eleventh example embodiment, wherein each set of energy expenditures further accounts for one or more of: a first plurality of points over a range of potential initial vehicle energy states; a second plurality of points over a range of potential initial vehicle freight load states; and a third plurality of points over a range of potential environmental conditions.

A fourteenth example embodiment includes the features of the thirteenth example embodiment, wherein the optimization performs an interpolation between two points of at least one of the first plurality of points, the second plurality of points, and the third plurality of points, the interpolation being in response to an input indicating a value intermediate said two points.

A fifteenth example embodiment includes the features of the eleventh example embodiment, wherein each set of energy expenditures further accounts for utilization of one or more automation features in controlling one or more vehicles of the fleet.

A sixteenth example embodiment includes the features of the eleventh example embodiment, wherein the optimization accounts for availability of one or more energy resources in determining the plurality of optimized dispatch assignments.

A seventeenth example embodiment includes the features of the sixteenth example embodiment, wherein the one or more energy resources include one or more of a diesel fueling, natural gas fueling, battery charging, battery exchange, and hydrogen filling.

A eighteenth example embodiment includes the features of the eleventh example embodiment, wherein the fleet optimization objective comprises a minimization of net energy expenditure of the fleet of vehicles.

A nineteenth example embodiment includes the features of the eleventh example embodiment, and the instructions are executable by one or more of the one or more processors to: operate a machine learning component to update a model component utilized in the determining the pre-optimization simulation matrix in response to fleet operation feedback provided by a telematics system; and re-determine the pre-optimization simulation matrix and re-perform the optimization in response to the updated model component.

A twentieth example embodiment includes the features of any one of the eleventh through nineteenth example embodiments, wherein the instructions are further executable by one or more of the one or more processors to dispatch a plurality of vehicles of the fleet of vehicles according to the plurality of optimized dispatch assignments. In a further form of the tenth example embodiment the instructions are further executable by one or more of the one or more processors to dispatch a plurality of vehicles of the fleet of vehicles according to the plurality of optimized dispatch assignments and to control operation of the plurality of vehicles according to the dispatching.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method for optimizing operation of a fleet of vehicles, the method comprising:
   providing a computer system-based optimization network including a plurality of nodes and a plurality of connections between respective pairs of the plurality of nodes, the plurality of nodes defining all potential destinations in the optimization network for freight delivery or pickup, the plurality of connections defining all potential sequences of nodes traversable over the optimization network;
   determining with the computer system-based optimization network a pre-optimization simulation matrix including a plurality of sets of energy expenditures for traversing respective ones of each of the connections, each of the plurality of sets of energy expenditures accounting for permutations of a plurality of different vehicle powertrains present in a fleet of vehicles,
   performing with the computer system-based optimization network an optimization using the pre-optimization simulation matrix, fleet information indicating current locations and current energy states of a plurality of vehicles in the vehicle fleet, mission information indicating a pickup destination and a delivery destination for a plurality of items of freight, and a fleet optimization objective, wherein the optimization determines a plurality of optimized dispatch assignments each defining at least a particular vehicle of the fleet, a selection of items from the plurality of items of freight, and a sequence of nodes for delivery or pickup the selection of items, a computational burden of the optimization performed with the computer system-based optimization network being reduced by use of the pre-optimization simulation matrix, and
   dispatching in response to output of the computer system-based optimization network a plurality of vehicles of the fleet of vehicles according to the plurality of optimized dispatch assignments and controlling operation of the plurality of vehicles according to the dispatching.

2. The method of claim 1, wherein the plurality of different vehicle powertrains comprise two or more of a combustion engine powertrain, a combustion-electric powertrain, a purely battery-electric powertrain, and a fuel-cell electric powertrain.

3. The method of claim 1, wherein each set of energy expenditures further accounts for one or more of:
   a first plurality of points over a range of potential initial vehicle energy states;
   a second plurality of points over a range of potential initial vehicle freight load states; and
   a third plurality of points over a range of potential environmental conditions.

4. The method of claim 3, wherein the optimization performs an interpolation between two points of at least one of the first plurality of points, the second plurality of points, and the third plurality of points, the interpolation being in response to an input indicating a value intermediate said two points.

5. The method of claim 1, wherein each set of energy expenditures further accounts for utilization of one or more automation features in controlling one or more vehicles of the fleet.

6. The method of claim 1, wherein the optimization accounts for availability of one or more energy resources in determining the plurality of optimized dispatch assignments.

7. The method of claim 6, wherein the one or more energy resources include one or more of a diesel fueling, natural gas fueling, battery charging, battery exchange, and hydrogen filling.

8. The method of claim 1, wherein the fleet optimization objective comprises a minimization of net energy expenditure of the fleet of vehicles.

9. The method of claim 1, comprising:

operating a machine learning component to update a model component utilized in the determining the pre-optimization simulation matrix in response to fleet operation feedback provided by a telematics system; and repeating the determining the performing the optimization in response to the updated model component.

10. A system for optimizing operation of a fleet of vehicles, the system comprising:

a computer system including one or more processors in operative communication with one or more non-transitory memory media, the one or more non-transitory memory media configured with instructions executable by one or more of the one or more processors to:

provide an optimization network including a plurality of nodes and a plurality of connections between respective pairs of the plurality of nodes, the plurality of nodes defining all potential destinations in the optimization network for freight delivery or pickup, the plurality of connections defining all potential sequences of nodes traversable over the optimization network;

determine a pre-optimization simulation matrix including a plurality of sets of energy expenditures for traversing respective ones of each of the connections, each of the plurality of sets of energy expenditures accounting for permutations of a plurality of different vehicle powertrains present in a fleet of vehicles, the pre-optimization simulation matrix being configured to reduce a computational burden on the one or more processors in performing an optimization;

perform the optimization using the pre-optimization simulation matrix, fleet information indicating current locations and current energy states of a plurality of vehicles in the vehicle fleet, mission information indicating a pickup destination and a delivery destination for a plurality of items of freight, and a fleet optimization objective, wherein the optimization determines a plurality of optimized dispatch assignments each defining at least a particular vehicle of the fleet, a selection of items from the plurality of items of freight, and a sequence of nodes for delivery or pickup the selection of items;

dispatch a plurality of vehicles of the fleet of vehicles according to the plurality of optimized dispatch assignments effective to control operation of the plurality of vehicles according to the dispatching.

11. The system of claim 10, wherein the plurality of different vehicle powertrains comprise two or more of a combustion engine powertrain, a combustion-electric powertrain, a purely battery-electric powertrain, and a fuel-cell electric powertrain.

12. The system of claim 10, wherein each set of energy expenditures further accounts for one or more of:

a first plurality of points over a range of potential initial vehicle energy states;

a second plurality of points over a range of potential initial vehicle freight load states; and a third plurality of points over a range of potential environmental conditions.

13. The system of claim 12, wherein the optimization performs an interpolation between two points of at least one of the first plurality of points, the second plurality of points, and the third plurality of points, the interpolation being in response to an input indicating a value intermediate said two points.

14. The system of claim 10, wherein each set of energy expenditures further accounts for utilization of one or more automation features in controlling one or more vehicles of the fleet.

15. The system of claim 10, wherein the optimization accounts for availability of one or more energy resources in determining the plurality of optimized dispatch assignments.

16. The system of claim 15, wherein the one or more energy resources include one or more of a diesel fueling, natural gas fueling, battery charging, battery exchange, and hydrogen filling.

17. The system of claim 10, wherein the fleet optimization objective comprises a minimization of net energy expenditure of the fleet of vehicles.

18. The system of claim 10, wherein said instructions executable by one or more of the one or more processors to:

operate a machine learning component to update a model component utilized in the determining the pre-optimization simulation matrix in response to fleet operation feedback provided by a telematics system; and re-determine the pre-optimization simulation matrix and re-perform the optimization in response to the updated model component.

* * * * *